United States Patent [19]

Lindstrom

[11] Patent Number: 5,192,428

[45] Date of Patent: Mar. 9, 1993

[54] PORTABLE SYSTEM FOR TREATING HUMAN WASTE

[75] Inventor: Carl R. Lindstrom, Cambridge, Mass.

[73] Assignee: Clivus Multrum, Inc., Lawrence, Mass.

[21] Appl. No.: 687,146

[22] Filed: Apr. 18, 1991

[51] Int. Cl.$^5$ .................................. C02F 3/02
[52] U.S. Cl. .......................... 210/143; 210/151; 210/170; 210/200; 210/241; 4/460; 4/463; 4/DIG. 12; 71/7; 71/9; 71/12
[58] Field of Search ............... 210/151, 153, 170, 200, 210/209, 232, 241, 253, 257.1, 607, 615, 617, 620, 903, 143; 4/460, 462, 463, DIG. 12; 71/7, 9, 12

[56] References Cited

U.S. PATENT DOCUMENTS

| | | | |
|---|---|---|---|
| 3,918,106 | 11/1975 | Hellqvist | 4/DIG. 12 |
| 4,084,269 | 4/1978 | Lindström | 4/DIG. 12 |
| 4,137,062 | 1/1979 | Mullerheim et al. | 71/9 |
| 4,196,082 | 4/1980 | Salokangas et al. | 210/180 |
| 4,213,864 | 7/1980 | Asikainen | 210/151 |
| 4,254,515 | 3/1981 | Kiyama et al. | 4/449 |
| 4,465,594 | 8/1984 | Laak | 210/151 |
| 4,501,665 | 2/1985 | Wilhelmson | 210/151 |
| 4,608,175 | 8/1986 | Nuttle | 210/532.2 |
| 4,894,872 | 1/1990 | Anderson, Jr. et al. | 4/DIG. 12 |

Primary Examiner—Stanley S. Silverman
Assistant Examiner—Christopher Upton
Attorney, Agent, or Firm—Hamilton, Brook, Smith & Reynolds

[57] ABSTRACT

A new portable system is disclosed for composting feces and for treating urine includes a composting retainer which includes a composting means for exposing the feces to sufficient air and water to allow the feces to compost, thereby forming a compost product. A urine-treatment retainer with aerobic nitrifying bacteria disposed on a substrate whereby urine is treated by the bacteria, thereby forming a liquid product. A means is available for transporting the portable system.

8 Claims, 1 Drawing Sheet

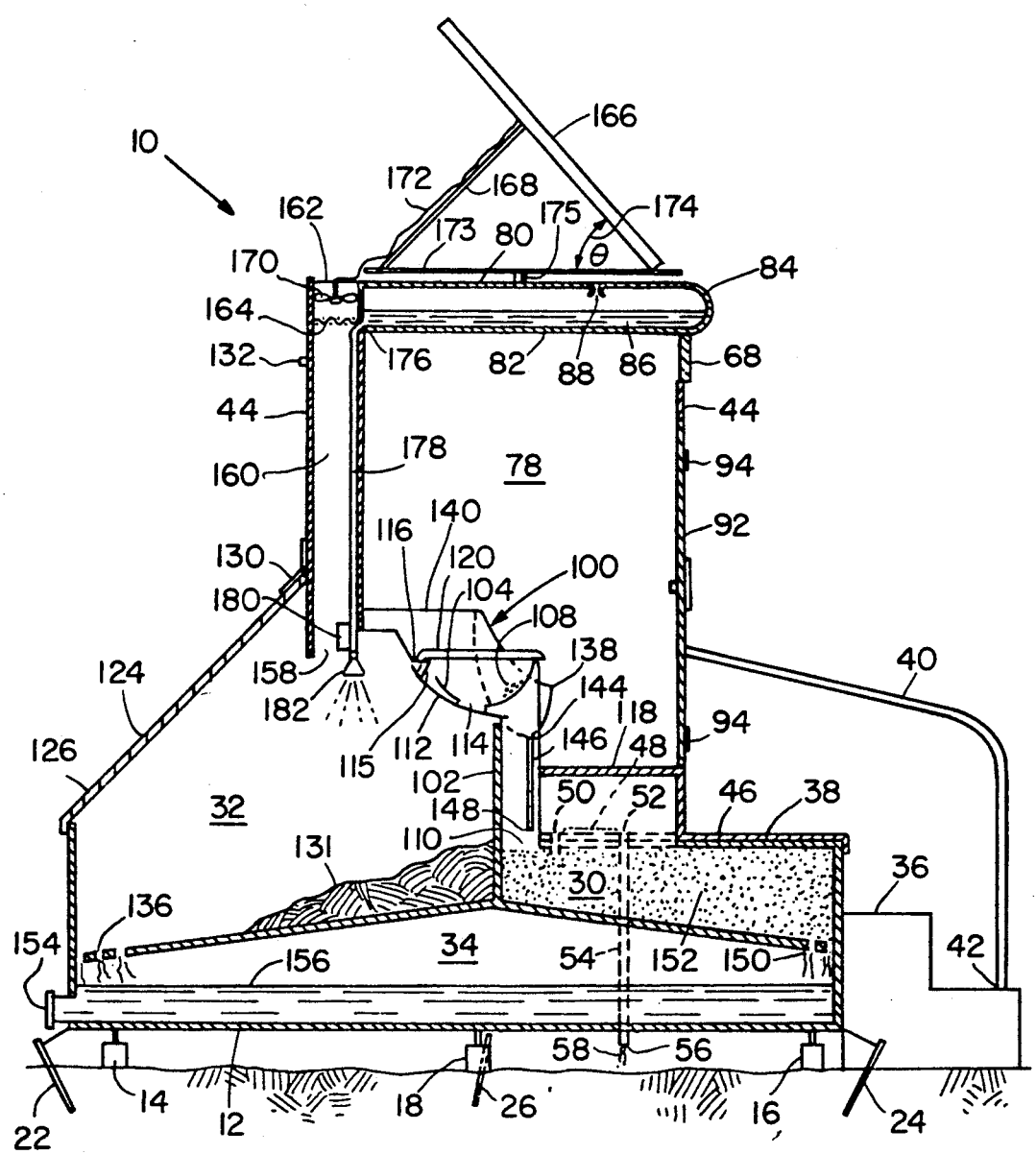

PORTABLE SYSTEM FOR TREATING HUMAN WASTE

BACKGROUND OF THE INVENTION

Disposal of human urine and feces has been difficult in remote areas. This problem has been particularly acute where rest facilities are required only temporarily. For example, temporary rest facilities cannot be readily connected to sewage treatment facilities at construction sites.

One attempt to provide temporary rest facilities are prefabricated transportable rest stations. Transportable rest stations generally include an enclosure in which a toilet is disposed over a single vessel. Urine and feces are collected from the toilet in the vessel. However, combined urine and feces do not decompose rapidly and consequently require that such rest stations be emptied frequently. Further, contents removed from temporary rest stations must be transported to a sewage treatment facility for treatment or disposal in a septic system. The odor of urine and feces collected in temporary rest stations typically generate a strong disagreeable odor. In addition, transportable rest stations are often bulky and consequently are difficult to transport.

A need exists, therefore, for a new system for treating urine and feces which overcome or eliminate the aforementioned problems.

SUMMARY OF THE INVENTION

The present invention relates to a new system for treating human urine and feces in a transportable rest station.

The system includes a base and a housing disposed on the base. A composting retainer is disposed within the base, which includes a feces inlet for receiving feces from a feces receiving means disposed within the housing, a compost outlet for removal of compost product from the retainer and a liquid passage, whereby liquid can be drained from the composting retainer through the liquid passage. A composting means is coupled to the composting retainer for exposing the feces to sufficient air and water to allow the feces to compost, thereby forming a compost product. A urine-treatment retainer is disposed within the base, including a urine inlet for receiving urine from a urine receiving means disposed within the housing, a substrate, aerobic nitrifying bacteria disposed on the substrate and liquid-product outlet, whereby urine is treated by the bacteria, thereby forming a liquid product. A liquid-storage vessel is disposed in the base for receiving liquid product from the urine-treatment retainer through the liquid-product outlet and for receiving liquid drained from the composting retainer through the liquid passage. A means is available for transporting the portable system.

This invention has many advantages. The rest station can be disassembled easily to allow shipping from one site to another at a fraction of the operational size. In addition, when in operation the rest station substantially separates the urine and feces to allow feces to compost. Ammonium ion containing urine is treated to nitrify the ammonium ions, thereby forming nitric acid, nitrous acid and nitrogen oxides, such as $NO_2$, $NO_3$, and $NO_4$ radicals. This nitrification substantially reduces odor generated by the collected urine. Since urine and feces are collected separately, the rate of composting of feces can be significantly increased. Also, the volume of liquid present in the feces is substantially reduced, thereby allowing a greater amount of aeration through the feces. A solar powered ventilation system can further assists this aeration. The composting rate of the feces can thereby be significantly increased. The amount of moisture in the feces can also be controlled to increase the rate of composting of collected feces.

BRIEF DESCRIPTION OF THE DRAWINGS

The FIGURE is a section view of one embodiment of a transportable rest station of the invention.

DETAILED DESCRIPTION OF THE INVENTION

The features and other details of the system of the invention will now be more particularly described with reference to the accompanying drawings and pointed out in the claims. It will be understood that the particular embodiments of the invention are shown by way of illustration and not as limitations of the invention. The principle features of this invention can be employed in various embodiments without departing from the scope of the invention.

In one illustration of the invention, shown in the FIG. 1, transportable rest station 10 includes base 12. Base 12 includes pads 14,16,18 which are adjustable in height for a varying terrain in order to maintain base 12 in a substantially level position. Further, base 12 has a series of anchor bolts 22,24,26 attached to the outer perimeter of base 12 to limit movement of transportable rest station 10. Urine retainer 30, composting retainer 32, and liquid storage vessel 34 are disposed within base 12. Steps 36 are adjacent to base 12 for access to base top 38. Hand rail 40 is attached at step surface 42 and base wall 44.

Base walls 44 are disposed on base floor 46. Base walls 44 form enclosed space 78 which is of sufficient size for standing and sitting room. A portion of base wall 44 has translucent window 68. Door 92 is suitably hung in base wall 44 to allow access from exterior to enclosed area 78. Base walls 44 are made of a material which is weather resistant and is of sufficient strength to support roof tank 84. An example of a suitable material is fiberglass reinforced polyester.

Base floor 46 is removable from base 12. Slip resistant pad 48 is attached to the base floor 46 to prevent slipping. Base floor 46 is of a size and shape sufficient to cover base 12. Urine drain inlet 50 is disposed in base floor 46 and is coupled to urine retainer 30 for draining urine to prevent puddling on base floor 46. Wash water drain inlet 52 is disposed on base 12 and is coupled to wash water drain tube 54 and to wash water drain outlet 56. Wash water drain 52 allows draining of wash water 58 and other cleaning fluids away from the base 12.

Roof tank 84 is disposed above base walls 44 and includes upper tank side 80 and lower tank side 82. Roof tank 84 is of a size and shape sufficient to cover enclosed space 78 of base walls 44. Lower tank side 82 is disposed at a sufficient distance above floor 78 to allow a human of average height to stand comfortably on base floor 48 within enclosed space 78. Roof tank 84 contains rainwater and stored water 86. Roof tank drain inlet 88 is disposed on upper tank side 80 for collecting water from upper tank side 80 in roof tank 84.

Visor toilet 100 is disposed in enclosed area 78. Alternatively, some other suitable type of toilet can be employed in place of visor toilet 100. In one embodiment, the toilet is a dry toilet. Toilet step 118 is disposed in front of visor toilet 100 to discourage use of visor toilet 100 as a urinal by standing males, thereby keeping toilet seat 120 clean. Head room in front of visor toilet 100 is intended to be restricted by toilet step 118.

Visor toilet 100 includes divider 102 to allow separation of urine and feces. Toilet bowl 104 is coated with a suitable material, such as polytetrafluoroethylene, to diminish accumulation of feces and urine on toilet bowl 104. Perforate screen 108 is disposed in toilet bowl 104 above urine inlet 110. Urine inlet 110 is coupled to urine retainer 30. Visor separator 112 is at bottom of toilet bowl 104. When visor toilet 100 is used in a seated position by humans, the toilet seat 120 is coupled to lever 115 to shift visor separator 112 to a position which allows collection of feces in feces retainer inlet 114. Visor toilet 100 is built in bench top 116. Feces retainer 32 is disposed adjacent to urine retainer 30. Feces retainer 32 is of a size and shape sufficient for expected use conditions of transportable rest station 10. Feces retainer 32 is located below visor toilet 100. Feces retainer 32 includes hatch inlet 124 which allows access to feces retainer 32 from the exterior of transportable rest station 10. In a closed position, illustrated in the FIGURE, lid 126 covers feces outlet 128 for shielding composted feces within feces retainer 32. Preferably, lid 126 is secured to transportable rest station 10 at wall 44 by hinge 130. Lid 126 is opened by rotating lid 126 about hinge 130 to thereby enable access to composted feces 131 within feces retainer 32. In one embodiment, lid 126 can be held open by lid clasp 132 on the exterior of base wall 44. Feces retainer 32 has feces retainer liquid outlet 136 for allowing liquid to drain from feces retainer 32 into liquid storage tank 34.

"Compost," as that term is used herein, means decomposition of feces, to form decomposed organic waste which is suitable for sterilization and subsequent use as fertilizer or mixture with soil to form topsoil. Once initiated, composting of solid waste in feces bed 131 is continuous during exposure of feces bed 131 to conditions sufficient to maintain composting of feces. Composting can be initiated spontaneously or can be initiated by combination of feces collected within feces retainer 32 with a suitable filler, such as wood chips, to allow sufficient aeration and drainage of feces bed 32 to cause composting. Preferably, the bacteria content of feces bed 131 is reduced in feces retainer 32 by about ninety-five percent before removal from feces bed 131.

Feces retainer 32 has a volume sufficient to retain feces for composting in feces bed 131. In one embodiment, feces retainer 32 has a volume of about seventy cubic feet. Feces in feces bed 131 is exposed to conditions sufficient to substantially compost the feces, thereby forming compost product. Conditions sufficient to allow the feces to compost include directing air across feces bed 131 at a rate sufficient to allow feces in feces bed 131 to substantially compost.

The moisture content of feces bed 131 is maintained in a range which is suitable for composting feces bed 131 by intermittently adding water onto the top of feces bed 131. The moisture content of feces bed 131 is maintained in a range which allows the feces to compost and thereby form compost product. Preferably, the moisture content in feces bed 131 is maintained in the range of between about sixty five percent and about eighty percent by weight. The moisture content of feces bed 131 can be maintained in a suitable range by intermittently adding water onto the top of feces bed 131. The moisture content in feces bed 131 can be determined by means known in the art.

The temperature of feces bed 131 is maintained in a range suitable for allowing the feces to compost and thereby form compost product. Preferably, the temperature of feces bed 131 is maintained in the range of between about 18° C. and about 40° C. It is to be understood that other suitable means can be employed to compost the solid waste. For example, earthworms can be introduced to feces bed 32 to establish a colony of earthworms which feed on the solid waste, thereby causing the solid waste to compost.

Urinal 138 is built into interior wall 140 next to visor toilet 100. Urinal 138 is sloped to direct the flow of urine to the lowest point in urinal 138 where urinal drain outlet 144 is located. Urinal outlet 144 is of a size sufficient and in a location for gravitational flow of urine into urinal drain pipe 146. Urinal drain pipe 146 is coupled to urinal retainer inlet 148.

Urine retainer 30 is located under urinal 138 in base 12. Urine retainer 30 is of a size sufficient for expected usage without emptying for a period of time. In one embodiment, urine retainer 30 has a capacity of about three hundred gallons. Urine retainer 30 has urinal inlet 110 and urine retainer outlet 150. Nitrification bed 152 is disposed within urine retainer 30 and is sufficiently dense to prevent uneven distribution or channeling of urine throughout nitrification bed 152.

Nitrification bed 152 includes a substrate which can support aerobic nitrifying bacteria and which is relatively stable. Also, suitable substrates can maintain a sufficient moisture content and allow sufficient aeration to support aerobic nitrifying bacteria for nitrifying a significant portion of ammonium ions in the urine collected in urine retainer 30. Examples of suitable substrates include loam, wood shavings and other cellulosic materials, etc. In a preferred embodiment, nitrification bed 152 comprises peat moss.

The amount of aerobic nitrifying bacteria supported by the substrate in nitrification bed 152 is sufficient to nitrify a significant portion of ammonium ions in urine collected under expected use-conditions of transportable rest station 10. Nitrification of the ammonium ions causes the ammonium ions to form, for example, nitrites and nitrates. Aerobic nitrifying bacteria can be introduced to nitrification bed 152 by indigenous bacterial growth or by artificially introducing aerobic nitrifying bacteria into nitrification bed 152. Examples of suitable aerobic nitrifying bacteria include Nitrobacter, Nitrosomonas, etc.

Liquid storage tank 34 is disposed under urine retainer 30. Liquid storage tank 34 is coupled to urine retainer outlet 150, feces retainer liquid outlet 134 and liquid drain outlet 154. Liquid drain outlet 154 is disposed in base 12 to allow removal of black water 156 stored within liquid storage tank 34 by draining or by use of a pump, not shown.

Feces air outlet 158 is disposed above feces retainer 32. Feces air outlet 158 is coupled to air vent 160. Air vent 160 is of sufficient size and shape to enable sufficient ventilation of feces retainer 32 to compost feces in feces bed 131. Air vent 160 includes air vent outlet 162 at roof tank 84. Air vent 160 allows ventilation of air from feces bed 131.

Air is drawn in through urinal 138 and visor toilet 100 by ventilation fan 170. Ventilation fan 170 at air vent outlet 62 is connected to solar panel 166 by means of electrical wire 172. Ventilation fan 170 is of sufficient capacity to ventilate feces retainer 32. In one embodiment, ventilation fan 170 has a ventilating capacity of about one hundred cubic feet per minute. One example of a suitable ventilation fan 170 has a direct current voltage of 12 volts and 0.5 amps and is a deep cycle accumulator to maintain a steady flow of air. In one embodiment, ventilation fan 170 is a brushless electronic field switch fan manufactured by Pabst Company. Odor and gases generated by the composting feces collected within the feces retainer 32 are substantially removed from transportable rest station 10. Further, air vent screen 164 is placed over air vent outlet 162 to prevent access to feces retainer 32 by insects or other animals.

Solar panel 166 is disposed on roof tank 84 supported by solar panel support 168. Solar panel 166 has sufficient capacity to drive ventilation fan 170. In one embodiment, the solar panel includes a panel of suitable silicon chips. Solar panel 166 is at a suitable angle 174 to the sun to allow sufficient absorption of radiant energy during variable weather conditions to operate ventilation fan 170. Solar panel 166 is disposed on platform 173. Platform 173 is coupled to pivot 175. Pivot 175 is coupled to upper tank side 80 to allow solar panel 166 to rotate about pivot 175.

Roof tank 84 has water tank outlet 176 which is coupled to a water conduit 178 with controlling means 180. Water conduit 178 is coupled to feces retainer 32. Controlling means 180 controls the amount of water to be added through nozzle 182 to feces retainer 32 to allow composting of feces at an adequate rate to prevent feces from becoming over-dried or over-wet.

Means for transporting transportable rest station 10 includes means for disassembly of transportable rest station 10 and subsequent storage of the resultant disassembled parts into base 12. For example, base floor 46 is attached to base 12 by bolts, screws or other suitable means. Also, base walls 44 are connected to the base floor 46 by screws, hinges or similar means providing easy assembly and disassembly. Further, base walls 44 are attached to base wall along the vertical edges by screws, bolts or similar means sufficient for easy assembly and disassembly.

Feces bed 131 and nitrification bed 152 are removed from transportable rest station 10 during disassembly of transportable rest station 10. Liquid storage vessel 34 and roof tank 84 are drained of liquid. Base floor 46 is removed and the disassembled components of transportable rest station 10 are stacked in base 12. Transportable rest station 10 is transportable by suitable means when disassembled. An example of such a suitable means is a flat bed truck.

Equivalents

Those skilled in the art will recognize, or be able to ascertain using no more than routine experimentation, many equivalents to the specific embodiments of the invention described specifically herein. Such equivalents are intended to be encompassed in the scope of the claims.

I claim:

1. A portable system for composting feces and for treating urine, comprising:
   a) a base;
   b) a housing disposed on the base;
   c) a composting retainer disposed within the base, including a feces inlet for receiving feces from a feces receiving means disposed within the housing, a compost outlet for removal of compost product from the retainer and a liquid passage for receiving liquid from the retainer;
   d) composting means coupled to the composting retainer for exposing the feces to sufficient air and water to allow the feces to compost, thereby forming a compost product;
   e) a urine-treatment retainer disposed within the base and at least partially partitioned from the composting retainer, including a urine inlet for receiving urine from a urine receiving means disposed within the housing, a substrate, aerobic nitrifying bacteria disposed on the substrate for treating urine to form a liquid product, and a liquid-product outlet;
   f) a liquid-storage vessel disposed in the base for receiving liquid product from the urine-treatment retainer through the liquid-product outlet and for receiving liquid drained from the composting retainer through the liquid passage; and
   g) means for transporting the portable system.

2. A system of claim 1 wherein the composting means includes a solar panel having means for generating electricity to operate a ventilation fan.

3. A system of claim 2 wherein the solar panel is disposed on the roof at an angle sufficient to generate power to ventilating means with sufficient power to circulate air from the composting retainer to the atmosphere outside the portable system.

4. A system of claim 3 wherein the solar panel is disposed on a pivot for rotating the solar panel to allow the solar panel to face the sun.

5. A system of claim 4 further including a housing floor which contains a floor drain coupled to the urine-treatment retainer for allowing liquid to drain into the urine-treatment retainer and preventing puddling on the housing floor.

6. A system of claim 1 wherein the housing walls and housing roof are detachable to allow the disassembly of the rest station.

7. A system of claim 1 wherein the base is disposed on at least three adjustable support pads for leveling of the base.

8. In a system for composting feces and for collecting urine by collecting feces and urine in a treatment vessel which has a urine treatment retainer, a composting retainer and means for exposing the collected feces to sufficient air and moisture in said composting retainer to allow feces to compost:

the improvement comprising a substrate supporting aerobic nitrifying bacteria disposed in the urine-treatment retainer which is at least partially partitioned from the composting retainer, means for passing urine through the urine-treatment retainer, whereby when urine is passed through the substrate, the substrate thereby forms liquid product, and means for adding water to said composting retainer and controlling means which controls the amount of water to be added to allow composting of feces at an adequate rate, thereby preventing the feces from becoming over-dried or over-wet.

* * * * *